Oct. 20, 1953  J. E. KLINE  2,655,771
HONING TOOL FOR EXTERNAL CYLINDRICAL SURFACES
Filed Feb. 6, 1950  2 Sheets-Sheet 1
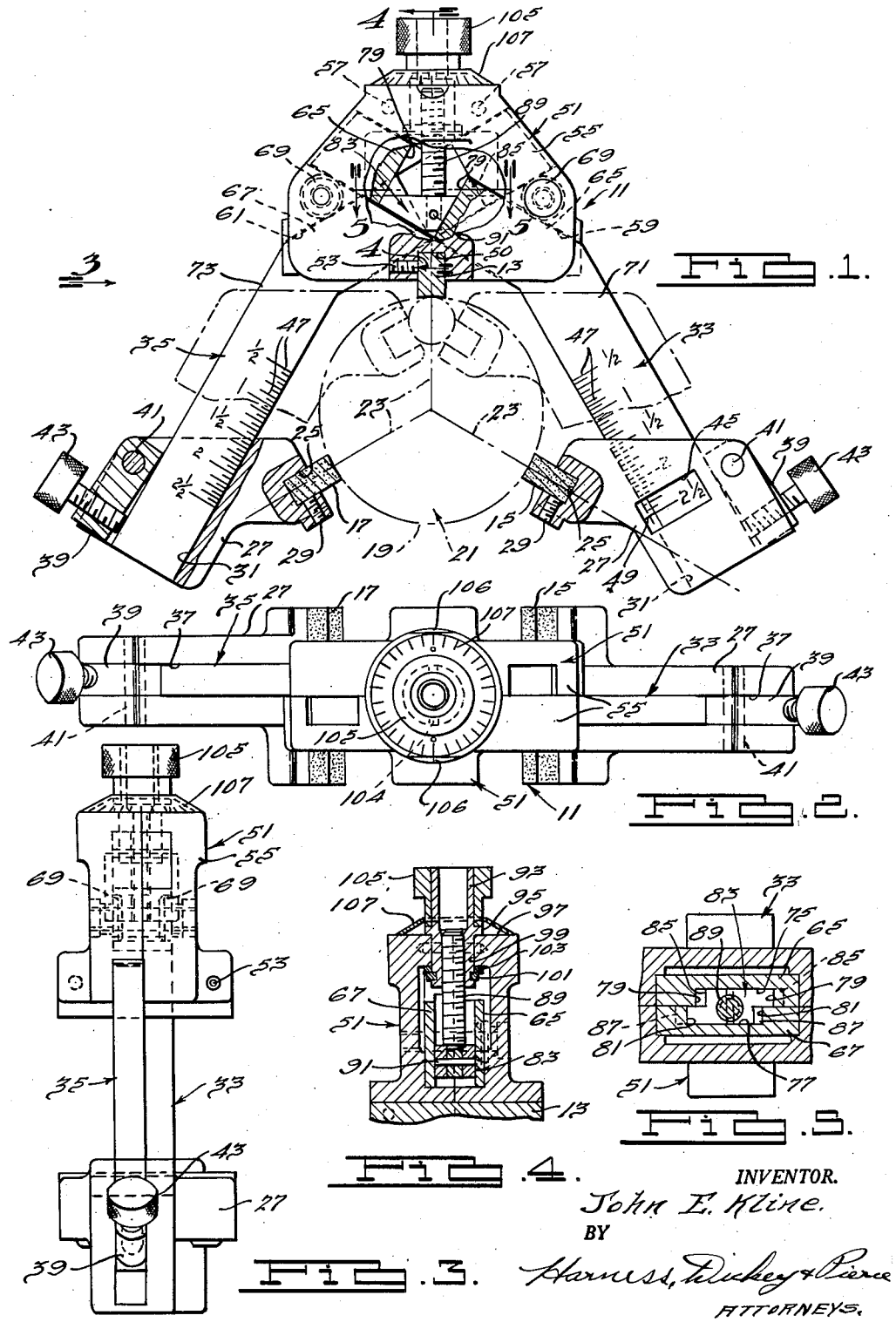
INVENTOR.
John E. Kline.
BY
Harness, Dickey & Pierce
ATTORNEYS.

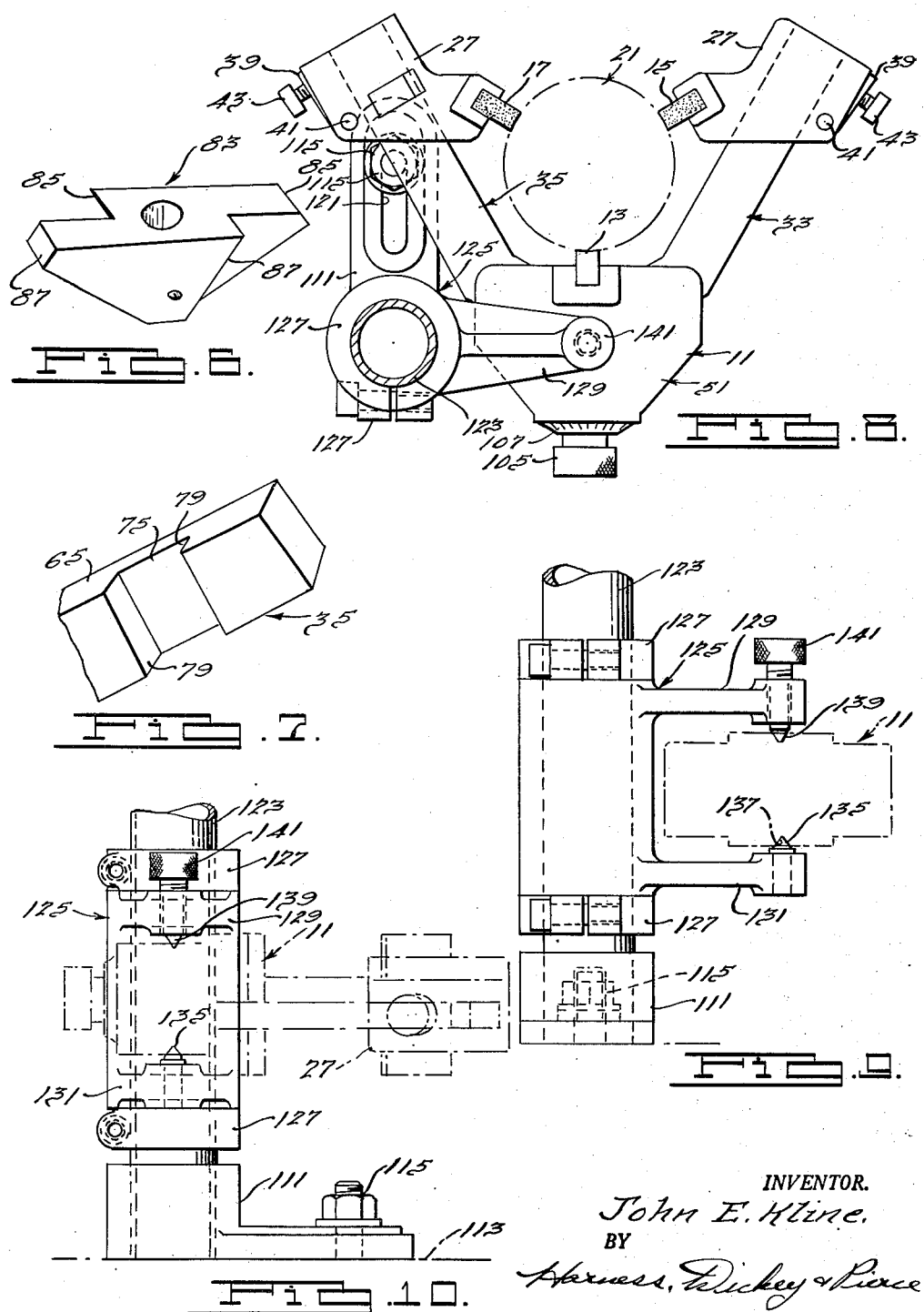

Patented Oct. 20, 1953

UNITED STATES PATENT OFFICE 2,655,771

HONING TOOL FOR EXTERNAL CYLINDRICAL SURFACES

John E. Kline, Grosse Pointe Farms, Mich., assignor to Micromatic Hone Corporation, Detroit, Mich., a corporation of Michigan Application February 6, 1950, Serial No. 142,636

11 Claims. (Cl. 51—184.1)

This invention relates generally to grinding tools and more particularly to a tool for honing or grinding external cylindrical surfaces.

It is an object of this invention to provide a simple, efficient tool for accurately honing or grinding exterior cylindrical surfaces, in order to remove tool marks or the like, which may be present on such surfaces as the result of prior metalworking operations, and/or in order to accurately grind and finish a workpiece to a desired size and true cylindrical shape.

It is a still further object of this invention to provide a tool of the aforementioned type which may be easily adjusted for use on various sized workpieces.

It is a still further object of this invention to provide a tool of the aforementioned type, in which the honing stones or work-engaging elements may be simultaneously adjusted, and will remain in proper engagement with the external cylindrical surface of a workpiece, and in proper relationship with respect to each other.

It is a still further object of this invention to provide a tool of the aforementioned type which may be either manually held in engagement with a rotating workpiece or supported on a worktable for engagement with a reciprocating and rotating workpiece.

It is a still further object of this invention to provide means for floatably supporting a tool of the aforementioned type for engagement with a reciprocating and rotating workpiece, in such a manner that the tool is free to align itself with respect to the workpiece, upon engagement thereof by the reciprocating and rotating workpiece.

It is a still further object of this invention to provide a tool of the aforementioned type, which is exceptionally efficient in operation, durable in use, and relatively inexpensive to manufacture and use.

These and other objects of this invention will become apparent from the following detailed description, taken in conjunction with the accompanying drawings, in which:

Figure 1 is a front elevational view of the tool of this invention, with parts broken away in section for purposes of clarity.

Fig. 2 is a top plan view of the structure illustrated in Fig. 1.

Fig. 3 is an end elevational view of the structure illustrated in Fig. 1, taken in the direction of the arrow 3 thereon;

Fig. 4 is a fragmentary sectional view of the structure illustrated in Fig. 1, taken along the line 4—4 thereof;

Fig. 5 is a fragmentary sectional view of the structure illustrated in Fig. 1, taken along the line 5—5 thereof;

Fig. 6 is a perspective view of the cam block of the tool illustrated in Fig. 1, which adjusts the stoneholder arms and thereby the stones relative to the workpiece;

Fig. 7 is a fragmentary perspective view of the inner end portion of one of the arms which carries a honing stone;

Fig. 8 is a top plan view of the tool of this invention supported by a supporting structure on the workbed of a drill press, or the like;

Fig. 9 is a front elevational view of the supporting structure illustrated in Fig. 8; and Fig. 10 is a side elevational view of the structure illustrated in Fig. 8.

Referring now to the drawings, and more particularly to Figs. 1–7, it will be seen that the honing or grinding tool 11 includes a plurality of work-engaging elements 13, 15 and 17, which are circumferentially spaced 120° apart for reasons which will hereinafter appear. While more than three work-engaging elements may be employed without departing from the scope of this invention, three such elements are shown, one of which, viz. element 13, is preferably made of an extremely hard metal such as Norbide, Stellite or tungsten carbide, which will not tend to wear or be abrasive. The other two work-engaging elements 15 and 17 are preferably abrasive honing stones of any suitable type. The three elements 13, 15 and 17 are generally rectangular in shape so that their work-engaging faces may engage the external cylindrical surface 19 of a workpiece 21 for grinding the workpiece to a desired diameter and/or removing any tool marks or other imperfections therefrom. The tool 11 illustrated in Fig. 1 is adapted to be manually inserted on a workpiece which is supported and rotatably driven in a lathe, or the like.

The work-engaging elements 13, 15 and 17 are supported so that the centers of their work-engaging faces coincide with radial lines 23 of the workpiece which are spaced substantially 120° apart. The abrasive stones 15 and 17 are mounted in recesses 25 in stone-supporting elements 27, and suitable means, such as setscrews 29, are provided for retaining the stones in their recesses. Each stone holder element 27 is slotted at 31 to provide a guideway for slidably receiving arm members 33 and 35. The outer portion of each stone holder 27 is slotted at 37 and has a clamp member or arm 39 pivotally mounted therein by means of a pin 41. The shank portion of a thumb screw 43 is threaded into each clamp member 39 adjacent the opposite end of the member from the pivot pin 41, and when screwed therein the shank end of the screw 43 moves into thrust engagement with each arm member 33 and 35, and each stone holder 27 will be secured in an adjusted position to its respective arm member by the cam effect of clamp member 39 as it pivots around pin 41 as a result of the thrust of screw 43 against arm 33 or 35.

The top face of each stone holder 27 is apertured at 45 so that a scale 47 on the face of each of the arm members 33 and 35 may be seen therethrough. A mark 49 is provided on each stone holder adjacent the opening 45 and by loosening the screw 43 each stone holder may be moved longitudinally along its respective arm member 33 or 35 to bring the mark 49 into alignment with a desired point on arm scale 47, in accordance with the diameter of the workpiece 21 with which the tool is to engage.

The work-engaging element 13 is supported in a recess 50 in the under side of a housing member 51 by any suitable means, such as setscrew 53. The housing member 51 is formed of two abutting platelike members 55 which, when secured together by suitable means such as screws 57, form the completed housing. The housing 51 is provided with an angularly extending slot 59 which extends at substantially right angles to the plane of the working face of the abrasive stone 15, and a second slot 61 which extends at substantially right angles to the plane of the working face of abrasive stone 17 and which intersects the first slot 59. The arm members 33 and 35 have portions 65 and 67, respectively, disposed in the slots 59 and 61 and extending substantially parallel to the side walls thereof. The arm portions 65 and 67 overlap each other and, while movable longitudinally of the slots, are retained against transverse movement relative to the slots by means of rollers 69 which are supported in suitable recesses in the housing 51. The rollers 69 engage the opposite side edges of each of the arm portions 65 and 67 adjacent the opposite ends thereof, so as to provide antifriction support for the arms in their sliding movement within the slots.

The arm members 33 and 35 have portions 71 and 73, respectively, which are disposed exteriorly of the housing and diverge at substantially a 60° angle. The stone holders 27 are adjustably mounted on the exterior portions of the arm members 33 and 35. The interior arm portions 65 and 67 have cross slots 75 and 77 (Fig. 5) therein, which have opposed, angularly extending, parallel end walls 79 and 81, respectively. Positioned in the recesses 75 and 77 is a cam block 83 which can be best seen in Fig. 6. The cam block 83 is formed with one set of opposed, angularly extending, parallel cam faces 85 and an adjacent set of opposed angularly extending parallel cam faces 87. The cam faces 85 of the cam block 83 slidably engage the opposed end walls 79 of the recess 75 and the cam faces 87 slidably engage the opposed end walls 81 of the arm recess 77.

The lower end of a vertically extending stud 89 is rigidly connected with the cam block 83 by suitable means, such as a pin 91. The upper end of the stud 89 is threadably connected with a nutlike member 93 having a shoulder 95 formed intermediate the ends thereof which engages the top face 97 of the housing 51. The lower end of the nut member 93 extends through a recess 99 in the housing 51, and the nut member is secured against axial movement relative to the housing by means of a retainer ring 101 and a washer 103. A serrated knob 105 is connected to the upper end of the nut member 93 by any suitable means, such as a pin 104, so that rotation of the knob will cause rotation of the nut member 93. An annular indicator scale 107 is connected with the knob 105, and zero marks 106 are provided on the top face 97 of the housing adjacent scale 107, so that the amount of rotation of the knob relative to the housing can be accurately determined.

When the knob 105 is rotated, the stud 89 will move upwardly or downwardly in accordance with the direction of rotation, due to its threaded connection with the nut member 93. The movement of the stud 89 will cause vertical movement of the cam block 83 so that its cam faces 85 and 87 will move along the end walls 79 and 81 of the arm member recesses 75 and 77, and will therefore cause the arm members to move either inwardly or outwardly in their respective housing grooves 59 and 61. Therefore, when the tool has been applied over a workpiece after the diameter settings of the stone holders 27 have been adjusted to that of the work, the engaging elements 13, 15 and 17 can be brought into and maintained in engagement with the surface of the workpiece, at the desired pressure, by actuating knob 105. Actuation of knob 105 will maintain the abrasive stones 15 and 17 in engagement with the cylindrical surface 19 of the workpiece 21 on the radial lines 23 of the workpiece and in the 120° spaced relationship, even though the stones 15 and 17 wear down to the stone holders 27.

Because the outer portions 71 and 73 of the arm members 33 and 35 diverge at a 60° angle, the stone elements 15 and 17 will engage the cylindrical surface of a workpiece at 120° spacing when the diameter of the workpiece coincides with the diameter at which the stone holders 27 are adjusted. While the maintenance of an arm diverging angle of 60° may not always be necessary, it is found to be advantageous in this construction and simplifies the construction by eliminating many geometrical problems.

The device illustrated in Figs. 1 through 7 may be slipped over the end of a workpiece, such as 21, and while the workpiece is rotated by any suitable means, the tool is reciprocated along the work axis and the stones are fed into the surface of the work. The stone pressure, being proportional to the resulting torque, is determinable by the torque resistance required of the operator. Hence, as he strokes the tool along the work, he can readily detect diametric variations in the workpiece and concentrate upon their correction. Thereafter, he need only manipulate the feed knob and uniformly stroke the tool over the length of the rotating workpiece until the desired final size for the latter is accomplished.

In the embodiment of the invention illustrated in Figs. 8 through 10, the same tool 11 is employed. However, instead of the operator holding and stroking the tool over a rotating workpiece, the tool is supported on a worktable 113 of a device such as a drill press, or the like. In order to properly support the tool, a support base 111 is secured to the worktable 113 by any suitable means, such as bolt and nut 115. The bolt 115 extends through an elongated slot 121 in the base 111, so that the base may be adjusted relative to the worktable. A cylindrical member 123 is rigidly connected to and extends upwardly from the base 111 and has rotatably mounted thereon a tool-supporting member 125. The tool-supporting member 125 is axially supported on the tubular member 123 by any suitable means, such as collars 127. The tool-supporting member 125 is formed with a pair of laterally extending arms 129 and 131 and the lower arm 131 carries a centering or positioning pin 135, one end of which is adapted to fit into a recess 137 in the wall of the housing 51. The upper arm 129 likewise carries a positioning or centering screw 139 in its outer end, and has a knob 141 on the upper end thereof so that the pointed end thereof may be brought into engagement with the housing 51. When properly mounted, the tool housing will pivot or turn relative to the supporting element 125 about the vertical axis of the centering elements 135 and 139.

The workpiece which is to be ground can be mounted in the ordinary chuck of a drill press so that it will be rotatably driven and can be vertically reciprocated while in engagement with the work-engaging elements of the tool 11. Thus, the cylindrical surface of the workpiece can be efficiently and simply ground to the desired size and finish.

It should be noted that the tool 11 and supporting structure can be adjusted relative to the workpiece and worktable by loosening the support base bolt and nut 115 and also by rotating the tool-supporting element 125 relative to the tubular member 123. However, if after these adjustments have been made, the tool work-engaging elements do not properly engage the cylindrical surface of the workpiece, the workpiece will automatically center the tool 11 with respect thereto, because of the floating or movable tool mounting which results from the connection of the tool 11 to its tool-supporting element 125 and the pivotal mounting of the tool-supporting element. A floating tool mounting is thus provided which eliminates, or at least greatly reduces, any alignment problems.

The tool of this invention may be used for many purposes; as a substitute for, or an adjunct to grinding when used with coarse-grit stones; as a hone when equipped with fine-grit stones; or as a lapping tool when lead, copper, cast-iron or other metallic or non-metallic lapping elements and lapping compounds are substituted for the stones. It is capable of economically producing precisely dimensioned cylindrical parts possessing bearing surfaces of any functional nature. It is versatile in its adaptations, of wide-range capacity and unique in construction.

What is claimed is:

1. A tool for dressing an external cylindrical surface of a workpiece including, in combination, a body, adjustable arms in said body crossing each other, a shiftable element carried by said body and cooperating with said arms at the point of crossing for simultaneously adjusting said arms longitudinally when said element is shifted, and a pair of rollers in said body each engaging the top of one arm and the bottom of the other arm at opposite sides of the point of crossing.

2. A tool for dressing an exterior cylindrical surface of a workpiece including, in combination, three work engaging elements, a housing supporting one of said elements, said housing having a pair of slots crossing each other at an angle of 120°, a pair of arms having a first portion disposed in said slots and extending beyond the crossing point thereof, and a second portion extending exteriorly of said housing being disposed at an angle to said first portion, the remaining two work engaging elements being mounted one upon each of said second arm portions to have the work engaging elements disposed 120° apart relative to a center disposed therebetween and equally spaced therefrom.

3. A tool as recited in claim 2 wherein said elements on said second arm portion are adjustable thereon to have all of the three elements engage circles of smaller radius while maintaining the angular relationship therebetween.

4. A tool as recited in claim 3, including indicia on said second arm portions for indicating the position of the elements thereon.

5. A tool as recited in claim 2, including an operating member in said housing engaging said first arm portions adjacent to the point of crossing thereof for shifting said first arm portions longitudinally of the length thereof.

6. A tool as recited in claim 5, including means in said housing for actuating said operating member.

7. A tool as recited in claim 6, including indicia on said last means for indicating the amount of adjustment of said last means.

8. In an adjusting device, a body having a pair of crossed slots therein disposed in a manner to produce opposite angles of 120° and 60° respectively, arms having a first portion disposed in said slots in crossed relation to each other, and a portion exteriorly of the body disposed at an angle of 30° thereto to have the second portion of one arm disposed at right angles to the first portion of the other arm.

9. A device as recited in claim 8, including means in said body for shifting said first arm portion in opposite directions lengthwise of said portions.

10. A device as recited in claim 9, including rollers in said body located between the first arm portions in the opposite angular areas in which the arm portions are spaced 60° apart and disposed in engagement with the top of one arm portion and the bottom of the other arm portion, the movement of the first arm portions tending to apply a movement in rotation to the roller in the same direction at the point of engagement therewith.

11. A tool as recited in claim 5, including rollers in said housing between the arm portions each side of the crossing point thereof and disposed in engagement with the top of one arm portion and the bottom of the other arm portion, the movement of the first arm portions tending to apply a movement in rotation to the roller in the same direction at the point of engagement therewith.

JOHN E. KLINE.

References Cited in the file of this patent

UNITED STATES PATENTS

| Number | Name | Date |
|---|---|---|
| 183,266 | Jordan | Oct. 17, 1876 |
| 351,550 | Weller | Oct. 26, 1886 |
| 1,048,542 | Kahle | Dec. 31, 1912 |
| 1,182,478 | Hanson | May 9, 1916 |
| 1,239,431 | Mallove | Sept. 4, 1917 |
| 1,543,006 | Hannifin | June 23, 1925 |
| 1,591,967 | Emerson | July 13, 1926 |
| 1,655,133 | Clase | Jan. 3, 1928 |
| 1,840,720 | Hutto | Jan. 12, 1932 |
| 1,857,047 | Enochson | May 3, 1932 |
| 1,967,744 | Craft | July 24, 1934 |
| 2,138,258 | Sievers | Nov. 29, 1938 |
| 2,249,388 | Kline | July 15, 1941 |
| 2,257,452 | Binns | Sept. 30, 1941 |
| 2,277,047 | Indge | Mar. 24, 1942 |
| 2,374,849 | Worley | May 1, 1945 |
| 2,451,600 | Woodcock | Oct. 19, 1948 |
| 2,474,756 | Papciak | June 28, 1949 |
| 2,502,381 | Indge | Mar. 28, 1950 |
| 2,516,648 | Ruch | July 25, 1950 |